US010659478B2

(12) United States Patent
Heilig (10) Patent No.: US 10,659,478 B2
(45) Date of Patent: May 19, 2020

(54) IDENTIFYING STEALTH PACKETS IN NETWORK COMMUNICATIONS THROUGH USE OF PACKET HEADERS

(71) Applicant: David Paul Heilig, Lancaster, PA (US)

(72) Inventor: David Paul Heilig, Lancaster, PA (US)

( * ) Notice: Subject to any disclaimer, the term of this patent is extended or adjusted under 35 U.S.C. 154(b) by 260 days.

(21) Appl. No.: 14/336,004

(22) Filed: Jul. 21, 2014

(65) Prior Publication Data

US 2016/0021131 A1    Jan. 21, 2016

(51) Int. Cl.
*H04L 29/06*    (2006.01)

(52) U.S. Cl.
CPC ...... *H04L 63/1425* (2013.01); *H04L 63/1408* (2013.01)

(58) Field of Classification Search
CPC .................................................. H04L 63/1425
See application file for complete search history.

(56) References Cited

U.S. PATENT DOCUMENTS

| | | | | |
|---|---|---|---|---|
| 6,424,627 B1 * | 7/2002 | Sørhaug | ................... | H04L 43/00 370/241 |
| 7,353,265 B2 * | 4/2008 | Gopalkrishnan | ... | G06F 11/3409 709/223 |
| 7,665,136 B1 * | 2/2010 | Szor | ...................... | G06F 21/566 709/220 |
| 7,668,954 B1 * | 2/2010 | Melvin | ............. | H04L 29/12839 709/224 |
| 7,861,284 B2 * | 12/2010 | Okamoto | ............. | H04L 63/083 726/3 |
| 8,079,030 B1 * | 12/2011 | Satish | ..................... | H04L 63/20 713/164 |
| 8,176,561 B1 * | 5/2012 | Hurst | ..................... | H04L 67/36 726/1 |
| 8,181,249 B2 * | 5/2012 | Chow | ................... | G06F 21/566 713/187 |
| 8,204,984 B1 * | 6/2012 | Aziz | ................... | H04L 63/0227 709/224 |
| 8,245,301 B2 * | 8/2012 | Evans | ................... | G06F 21/552 726/22 |

(Continued)

OTHER PUBLICATIONS

NPL Search (InnovationQ) (Year: 2020).*

*Primary Examiner* — Mahfuzur Rahman
*Assistant Examiner* — Richard W Cruz-Franqui
(74) *Attorney, Agent, or Firm* — Ellenoff Grossman & Schole LLP; James M. Smedley; Alex Korona (57) ABSTRACT

A host computer system contains a software module that monitors and records network communications that flow through the legitimate network channels provided by the operating system and reports this information to a central processing server. A computer system acting as a central processing server compares network communications data received from the host computer system with the overall network traffic. Network traffic that is not reported from the host computer system is likely the result of stealth network traffic produced by advanced malware that has hidden its communications by circumventing the legitimate network channels provided by the OS. Detection of this stealth network traffic can be accomplished by using just the packet header information so the data payload does not need to be recorded, thereby reducing the memory requirements and reducing the need to save any potentially sensitive information.

20 Claims, 4 Drawing Sheets

(56) References Cited

U.S. PATENT DOCUMENTS

| | | | | |
|---|---|---|---|---|
| 8,307,072 B1* | 11/2012 | Melvin | H04L 29/12839 | 709/224 |
| 8,443,449 B1* | 5/2013 | Fan | G06F 21/564 | 713/188 |
| 8,516,586 B1* | 8/2013 | Jensen | H04L 63/1425 | 713/153 |
| 8,611,268 B1* | 12/2013 | Thandaveswaran | H04W 52/0206 | 370/311 |
| 8,726,010 B2* | 5/2014 | Mathur | G06F 21/10 | 713/150 |
| 8,751,814 B2* | 6/2014 | Nagai | G06F 21/10 | 713/182 |
| 8,819,829 B1* | 8/2014 | Martini | H04L 67/303 | 726/24 |
| 8,973,088 B1* | 3/2015 | Leung | H04L 63/00 | 726/1 |
| 9,800,608 B2* | 10/2017 | Korsunsky | G06F 21/55 | |
| 10,313,372 B2* | 6/2019 | Heilig | H04L 63/1425 | |
| 2003/0217260 A1* | 11/2003 | Okamoto | H04L 63/083 | 713/153 |
| 2004/0148546 A1* | 7/2004 | Meyer | H04L 1/1621 | 714/18 |
| 2006/0129499 A1* | 6/2006 | Combar | G06Q 20/102 | 705/64 |
| 2007/0050846 A1* | 3/2007 | Xie | H04L 63/0245 | 726/22 |
| 2008/0005782 A1* | 1/2008 | Aziz | G06F 21/55 | 726/3 |
| 2009/0303883 A1* | 12/2009 | Kucharczyk | H04L 12/4645 | 370/241 |
| 2009/0323703 A1* | 12/2009 | Bragagnini | H04L 29/1233 | 370/401 |
| 2010/0154059 A1* | 6/2010 | McNamee | H04L 43/00 | 726/23 |
| 2011/0004876 A1* | 1/2011 | Wu | H04L 12/4625 | 718/1 |
| 2012/0089471 A1* | 4/2012 | Comparelli | G06Q 20/20 | 705/18 |
| 2012/0117653 A1* | 5/2012 | Chow | G06F 21/566 | 726/24 |
| 2013/0117849 A1* | 5/2013 | Golshan | G06F 21/53 | 726/23 |
| 2013/0166981 A1* | 6/2013 | Lee | H04L 1/08 | 714/748 |
| 2013/0167180 A1* | 6/2013 | Georgescu | H04L 65/4084 | 725/93 |
| 2013/0247182 A1* | 9/2013 | Levites | G06F 21/55 | 726/22 |
| 2014/0293824 A1* | 10/2014 | Castro Castro | H04L 41/142 | 370/252 |
| 2015/0007316 A1* | 1/2015 | Ben-Shalom | H04L 63/0227 | 726/23 |
| 2015/0128265 A1* | 5/2015 | Jover | H04L 63/1441 | 726/23 |
| 2016/0006755 A1* | 1/2016 | Donnelly | H04L 63/0263 | 726/1 |
| 2016/0021131 A1* | 1/2016 | Heilig | H04L 63/1425 | 726/23 |
| 2016/0261611 A1* | 9/2016 | Heilig | H04L 63/1425 | |
| 2017/0163670 A1* | 6/2017 | Manadhata | H04L 63/1416 | |
| 2018/0139224 A1* | 5/2018 | Arnell | H04L 41/12 | |

* cited by examiner

IDENTIFYING STEALTH PACKETS IN NETWORK COMMUNICATIONS THROUGH USE OF PACKET HEADERS

FIELD OF THE INVENTION

The present invention generally relates to detecting network activity that is unknown to the software running on the computer it is coming from. Specifically, embodiments of the present invention provide for detecting stealth malware on a host computer by comparing the network traffic known to the host with the network traffic actually going to and from the host.

BACKGROUND OF THE INVENTION

As host based network defenses get stronger, malware writers are adapting by becoming stealthier. Stealth techniques can hide many aspects of a malware infection on a system from the user, from the operating system, and from host based security software. Malware can run in environments outside of the operating system, including the BIOS or on devices such as a graphic or network card. Hardware implants, such as the type used for espionage, also allow attackers to circumvent any host based security. These types of infections cannot be detected with any tool running on the compromised machine. Therefore, in order to identify advanced infections one must look at the activity outside of the machine itself. One of the best places to look for advanced infections is network communications because almost all malware requires network access to perform functions such as receiving additional instructions, transferring stolen information or infecting additional machines.

While stealth is an effective method, it produces an identifiable anomaly if the malware has to communicate on the network, i.e. network traffic that the host system is not aware of. In a normal computer environment, the only network traffic that is generated should come from within the operating system itself and flow through the legitimate network channels the operating system provides. Because malware can circumvent these legitimate network channels, it is able to send and receive network traffic without higher level software recognizing that communications are occurring. However, this stealth network traffic is still visible to the network hardware that handles it. Because it looks like legitimate network traffic, many network security devices are not able to determine that the traffic came from a malicious source without looking into the packet payload to find signatures of known malware behavior. This method of detection is unable to find unknown malware, and is computationally intensive because it requires comparing data snippets from both legitimate and malicious sources with a large database of known malware signatures. With the proposed method, the mere existence of a packet that has not been seen by the accepted data pathways is indication enough of a possible malicious compromise.

A similar method is disclosed in U.S. Pat. No. 8,079,030 to Satish et al. which claimed a method of identifying stealth network traffic using a hypervisor to monitor a virtual machine wherein the hypervisor monitors data flowing out of the virtual guest machine and determines if the hypervisor data matches the virtual guest machine data. If they do not match, then a stealth technique was used to communicate over the network. There are at least two problems with this implementation; First, a hypervisor is a piece of software that runs on the hardware of a single machine, and provides a layer of abstraction and virtual hardware to Operating Systems (OSs) that run on it. This means that the scope of the hypervisor's ability to monitor network communications is limited to a single physical machine. A hypervisor cannot monitor an entire network of independent physical machines. Second, a hypervisor runs on the same physical machine that may be infected with malware. This makes the hypervisor susceptible to the same type of tactics the malware uses against the OS. There is no guarantee that the malware 202 is not fooling the hypervisor or simply running outside what is able to be monitored, so the network traffic captured by the hypervisor may not actually represent all network traffic to and from the physical machine. The method proposed in the present invention is scalable to practically any size network and practically guarantees that stealth network traffic will be detected on the network. These and other features and advantages of the present invention will be explained and will become obvious to one skilled in the art through the summary of the invention that follows.

SUMMARY OF THE INVENTION

Accordingly, it is an object of the present invention to provide a system and method for detecting stealth network communications which have been hidden from the Operating System (OS) of a host computer system by comparing actual network traffic to the network traffic known to the OS of the host computer system.

According to an embodiment of the present invention, a computer implemented method for detecting stealth network traffic comprises: receiving at a server a known network traffic report corresponding to a host computer system, wherein the host computer system and the server are separate physical machines, and wherein the known network traffic report comprises information about all network traffic known to an operating system of the host computer system; receiving a network capture report, wherein the network capture report comprises information about actual network traffic corresponding to the host computer system; and comparing individual packet header information from the known network traffic report to individual packet header information from the network capture report to identify stealth network traffic, wherein the stealth network traffic is actual network traffic corresponding to the host computer system which was not known to the operating system running on the host computer system.

According to an embodiment of the present invention, the computer implemented method of further comprises sending an alert to a user, indicating the suspicious network traffic has been identified.

According to an embodiment of the present invention, the computer implemented method of wherein the alert includes detailed information about the suspicious network activity.

According to an embodiment of the present invention, the computer implemented method wherein the network capture report is compiled from information gathered by a plurality of network capture devices.

According to an embodiment of the present invention, the computer implemented method wherein the network capture report comes from a network capture device on the same physical system as the server.

According to an embodiment of the present invention, the computer implemented method wherein the known network traffic report is received by encrypted communications.

According to an embodiment of the present invention, the computer implemented method wherein the server comprises a software module running on a general purpose computer system.

According to an embodiment of the present invention, the computer implemented method wherein the server comprises hardware and firmware designed and primarily dedicated to performing the function of the server.

According to an embodiment of the present invention, a computer-based system for detecting stealth network traffic comprises: a server module configured to receive a known network traffic report corresponding to a host computer system on a separate physical machine from the server module; receive a network capture report, wherein the known network traffic report comprises information about all network traffic known to an operating system of the host computer system, and wherein the network capture report comprises information about actual network traffic corresponding to the host computer system; and a calculation module configured to compare individual packet headers from the known network traffic report to individual packet headers from the network capture report to identify stealth network traffic, wherein the stealth network traffic is actual network traffic corresponding to the host computer system which was not known to the operating system running on the host computer system.

According to an embodiment of the present invention, the computer-based system further comprises an alert module configured to send an alert a user, indicating that the suspicious network traffic has been detected.

According to an embodiment of the present invention, the computer based system wherein the alert includes detailed information about the suspicious network traffic.

According to an embodiment of the present invention, the computer-based system further comprises one or more network capture devices for capturing the network traffic necessary to produce the network traffic report.

According to an embodiment of the present invention, the computer-based system wherein the network capture device is incorporated into the same physical system as the server module.

According to an embodiment of the present invention, the computer-based system wherein the known network traffic report is received by encrypted communications.

According to an embodiment of the present invention, the computer-based system wherein the server module comprises a software module running on a general purpose computer system.

According to an embodiment of the present invention, the computer-based system wherein the server module comprises hardware and firmware designed and primarily dedicated to performing the functions of the server.

According to an embodiment of the present invention, a computer implemented method for detecting stealth network traffic comprises: receiving a known network traffic report corresponding to a host computer system, wherein the known network traffic report comprises information about all network traffic known to an operating system of the host computer system; receiving a network capture report from one or more network capture devices on a separate physical machine from the host computer system, wherein the network capture report comprises information about actual network traffic corresponding to the host computer system; and comparing individual packet header information from the known network traffic report to individual packet header information from the network capture report to identify stealth network traffic, wherein the stealth network traffic is actual network traffic corresponding to the host computer system which was not known to the operating system running on the host computer system.

According to an embodiment of the present invention, the computer implemented method further comprises sending an alert to a user, indicating the suspicious network traffic has been identified.

According to an embodiment of the present invention, the computer implemented method wherein the alert includes detailed information about the suspicious network activity.

According to an embodiment of the present invention, the computer implemented method wherein the known network traffic report is received by encrypted communications.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to detecting network activity that is unknown to the software running on the computer it is coming from. Specifically, embodiments of the present invention provide for detecting stealth malware on a host computer by comparing the network traffic known to the host with the network traffic actually going to and from the host.

Figure 1:
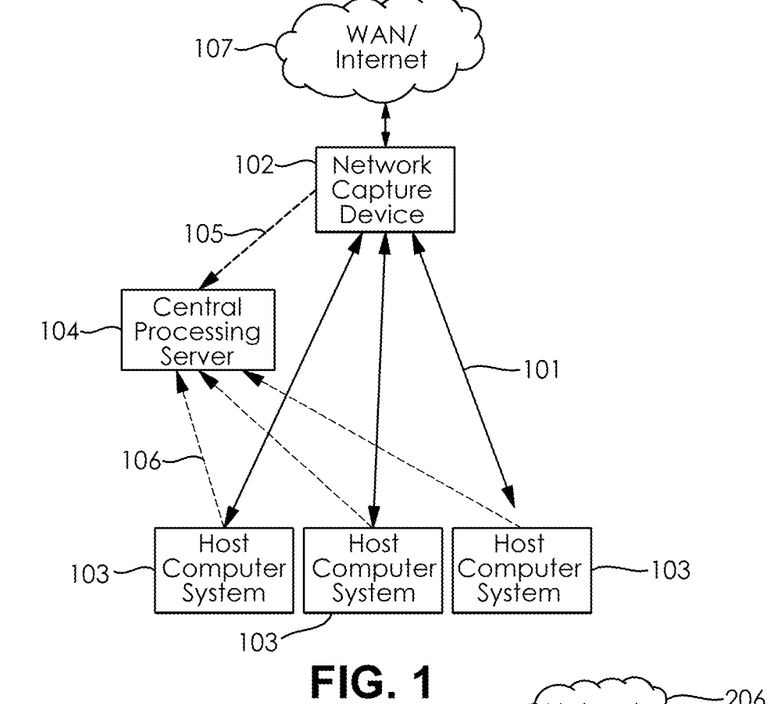
FIG. 1 is a high-level diagram of the various components in one embodiment of the present invention interconnected through a network.

According to an embodiment of the present invention, FIG. 1 illustrates the basic operation of the present invention and the various components interconnected through network data paths 101. A network capture device 102 sits in a position on the network where it can capture all the required network traffic on the network data paths 101. The required network traffic is defined by all network traffic corresponding to the host computer systems 103 that are being monitored. For example if an entire network is to be monitored, the network capture device 102 should be placed at a point where it will be able to see all the network traffic. This position may be between the network and a larger network or Wide Area Network (WAN) 107, such as the internet; or the network capture device 102 may be at some other advantageous position depending on the topology and design of the individual network. The function of the network capture device 102 could even be accomplished by using multiple network capture devices 102 strategically placed throughout the network such that, when combined, they together collect all the network traffic corresponding to the host computer systems 103 that are being monitored. In the trivial case of monitoring a single host computer system 103, the network capture device 102 may be incorporated into the host computer system 103 being monitored, or be attached just outside the host computer system 103. One of ordinary skill in the art would recognize there are a variety of means for capturing all required network traffic through a single device or multiple devices distributed throughout the network, and embodiments of the present invention are contemplated for use with any means for capturing required network traffic.

According to a preferred embodiment of the present invention, the network capture device 102 is on a separate physical machine from the host computer system 103 being monitored. Being on a separate physical machine means it is either its own piece of dedicated hardware, or incorporated into the hardware of a larger computer system independent from the host computer system. The primary advantage of this is that it ensures that the network capture device 102 will not be affected by malware 202 that may be running on one or more host computer systems 103. This also allows some degree of freedom to strategically place the network capture device where it can collect the required network traffic corresponding the host computer systems 103 being monitored.

According to an embodiment of the present invention, data captured by the network capture device 102 is compiled into a network capture report 105. The network capture device 102 may be configured to automatically generate network capture reports 105 periodically, or it may be configured to respond to queries 105, or it may merely store the captured data in a database within the network capture device 102 or elsewhere on the network where another component can access the data to generate the network capture reports 105. A network capture report need not comprise all traffic on a network, and multiple network traffic reports each generated by a separate device on the network could be combined to capture all required network traffic. One of ordinary skill in the art would recognize that there are a variety of ways to accomplish the task of creating network capture reports 105.

One of the advantages of the present invention is that the actual payload of packets does not need to be copied or inspected. All the information required for detecting stealth network traffic is in the packet header. This greatly reduces the amount of storage space required by the present invention, increases the speed with which a network capture report 105 can be transmitted and analyzed, and reduces overhead on the network and computing power required of the central processing server 104.

According to an embodiment of the present invention, one or more host computer systems 103 are also connected to the network data paths 101. Each of these host computer systems 103 gathers information about the network communications known to an Operating System (OS) running on that particular host computer system 103. The information about the network communications known to the OS is compiled into a known network traffic report 106. Both the known network traffic report 106 and the network capture report 105 are sent to the central processing server 104, where they are compared. Any traffic to or from a host computer system that shows up in the network capture report 105 but not in the same host computer system's known network traffic report 106 is considered stealth network traffic and causes an alert to be generated.

The alert can be as simple as a notification that stealth network traffic was found. It may also indicate which host computer is responsible for the stealth network traffic. However, one of the advantages of the present invention is that discovering which individual packets caused the alert is trivial because these packets are naturally identified in the comparison between known network traffic and captured network traffic. The information from the headers of these packets could be included in detailed information about the alert so that a qualified network manager can interpret the alert and decide how to address it. In one embodiment of the present invention, the network capture device keeps a temporary log of all network traffic captured, including packet payload. This allows the central processing server 104 to retrieve the full packet which caused an alert so that the packet's payload can be analyzed to detect a possibly unknown malware threat or identify what data, if any, has been compromised. One of ordinary skill in the art would recognize there are a variety of ways to issue an alert and a variety of levels of detail that an alert can include.

Figure 2:
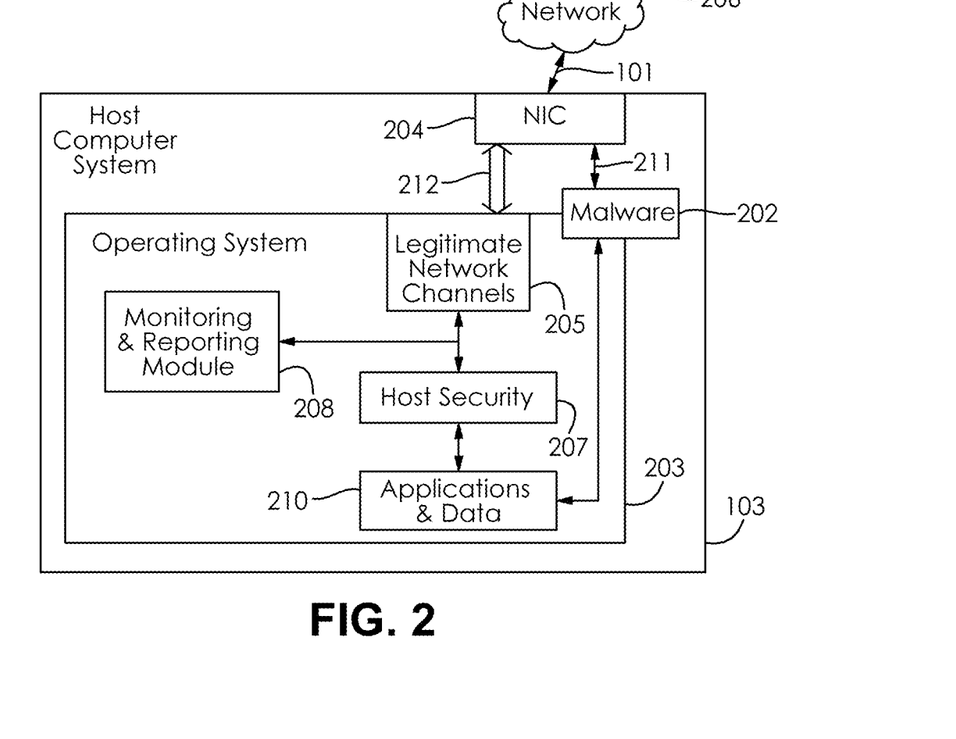
FIG. 2 is a block diagram of an exemplary host computer system, showing how the monitoring and reporting module accesses, records, and reports known network traffic and how malware hides network traffic from the operating system.

The individual components of the present invention will now be explained in further detail with reference to the figures. According to an embodiment of the present invention, FIG. 2 shows a host computer system 103 that may be infected with malicious software, or malware 202. Advanced malware 202 may run within or outside the OS 203. In either case the malware 202 may use network communication hardware, such as the Network Interface Card (NIC) 204 by circumventing legitimate network channels 205 of communication established by the OS 203. Network communication that does not use the legitimate network channels 205 established by the OS is considered stealth network traffic 211. When this happens, the malware 202 may steal private information from applications and data 210 on the host computer system 103, or propagate to the rest of the network 206 over the network data pathways 101, without being detected by host security 207 software installed on the host computer system 103.

According to an embodiment of the present invention, a monitoring and reporting module 208 is installed on the host computer system 103. This monitoring and reporting module 208 interfaces with the legitimate network channels 205 established by the OS 203 of the host computer system 103 and creates a known network traffic report 106 from the packet headers of all known network traffic 212 sent over the legitimate network channels 205. Like the network capture report 105, all the information required for the known network traffic report 106 can be obtained from packet headers. Neither the network capture report 105 nor the known network traffic report 106 needs to be formatted or compiled in any particular manner as long as the data contained in them is readable and usable for the purpose described in the present invention. Any information that uniquely identifies individual packets and allows them to be compared to other packets is usable for the purpose of the present invention. The preferred method of creating the known network traffic report 106 is through a software-implemented monitoring and reporting module 208 installed on the host computer system's 103 Operating System 203. This eases implementation on a network with a large number of host computer systems and provides built-in access to the data required, depending on the OS. It is particularly advantageous for the monitoring and reporting module 208 to have access to the packet headers of all known network traffic 212 sent through legitimate network channels 205 and only known network traffic 212 sent through legitimate network channels 205. The fact that stealth network traffic is unknown to the OS is the very thing that makes it detectable by the present invention. Therefore, giving the monitoring and reporting module 208 access to the lower levels of network traffic where the malware 202 might be hiding its network traffic would only serve to reduce the ability to detect malware.

The data required for the known network capture report 106 may be gathered by a variety of means, including, but not limited to, hooking into the appropriate framework provided by the OS 203, piggy-backing onto another piece of host security 207 software, or by accessing a log file generated by the OS 203 or a resident program. One of ordinary skill in the art would recognize that depending on the OS 203 there will be a variety of ways to gain access to the data required to produce the known network traffic report 106.

According to an embodiment of the present invention, either the known network traffic report 106, or the network capture report 105 or both are transmitted to the central processing server 104 over the network using encrypted communications. This provides a way to prevent and detect tampering by a piece of malware 202 that might try to spoof the communications between the monitoring and reporting module 208 and the central processing server 104. This encryption makes it much more difficult for malware 202 to insert its own traffic into the known network traffic report 106, or pose as a monitoring and reporting module and send its own known network traffic reports 106. Either of these activities on the part of malware 202 would produce data corruption or inconsistencies in the known network traffic reports that would be trivial for the central processing server 104 to detect.

Figure 3:
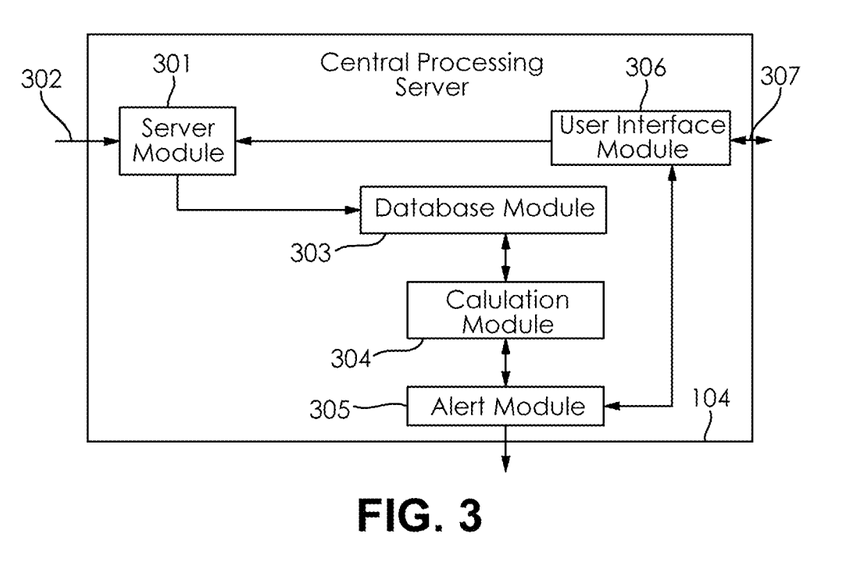
FIG. 3 shows a block diagram of one embodiment of the central processing server, its various components and how they interact with each other and the other devices on the network.

According to a preferred embodiment of the present invention, FIG. 3 shows a block diagram of a central processing server 104. A server module 301 is configured to initiate network connections or accept network connections from other devices on the network. The server module 301 receives known network traffic reports 106 corresponding to host computer systems 103 and network capture reports 105 from the network capture device 102 over the network connection 302 and sends them to the database module 303. The database module 303 stores data used to perform the various calculations for detecting stealth network traffic and the results of those calculations. The calculation module 304 is the heart of the central processing server 104, as it performs the comparison between the known network traffic reports 106 and network capture reports 105 received over the network connection 302. The calculation module 304 identifies stealth network traffic 211 by comparing network traffic corresponding to a particular host computer system 103 with known network traffic 212 reported by the same host computer system 103. This comparison is performed for each host computer system 103 with a monitoring and reporting module 208 installed, and the results are stored with the database module 303. If stealth network traffic 211 is detected, the alert module 305 sends an alert to the appropriate personnel.

A user interface module 306 allows for manual configuration of the central processing server in whatever way is convenient or useful. Manual configuration may be done either locally or remotely via a configuration connection 307. Manual configuration allows, among other things, designating certain devices on the network that do not send known network traffic reports 106, such as network management hardware, IP phones, game consoles, or multimedia streaming devices, etc. These devices are either unlikely to be infected with malware 202, or incapable of installing and running third-party software, such as the monitoring and reporting module 208. Eliminating them from data analysis allows the central processing server 104 to collect and analyze less than all of the actual network traffic, further reducing computational power requirements. Various other possible configuration options include, but are not limited to, setting alert thresholds, defining where and how alerts should be sent, choosing network traffic to ignore, auto-detecting host computer systems 103 with and without the monitoring and reporting module 208 installed, etc.

The central processing server 104 may be implemented either as a standalone physical unit dedicated to the tasks of the central processing server described above, in hardware, firmware, or in software running on a general purpose server on the network. The central processing server 104 may also be integrated into the same system with the network capture device 102 or simply interface with network capture-capable hardware already deployed on the network. One or ordinary skill in the art would recognize that there are a variety of ways to implement the central processing server without departing from the spirit and scope of the invention.

The monitoring and reporting module 208 which runs on the host computer systems 103 will now be explained in greater detail with reference to the flowchart in FIG. 4. According to an embodiment of the present invention, in step 401, the monitoring and reporting module 208 collects network traffic data from the OS. The specific method of gaining access to this information is dependent upon the OS, or other software installed on the system. Methods of accessing network traffic data on an OS are generally well documented and widely used by third-party internet security programs to provide data security services. The only data required by the central processing server 104 can be obtained by extracting packet headers of IPv4, IPv6, or any other network protocol packets, as shown in step 402. Examining only packet headers greatly reduces the overhead of the monitoring and reporting module which has little or no noticeable impact on the performance of the host computer system. Step 403 stores traffic data in the network traffic database 410. The traffic data in the network traffic database 410 will later be included in the known network traffic report 106.

In step 404, the monitoring and reporting module decides whether to send a known network traffic report 106 to the central processing server 104. Sending the known network traffic report 106 can be done at the expiration of a timer, upon receiving a request from the central processing server, or after a specific number of packets have been processed, etc. The known network traffic report 106 could also be stored at a network location where the central processing server 104 could access it as needed. One of ordinary skill in the art would recognize that there are a variety of ways give the central processing server 104 access to the known network traffic report 106, and also to decide when to send reports, and any one method or a combination of methods could be used as needed.

When it is determined that a known network traffic report 106 should be sent, the monitoring and reporting module 208 gathers data from the network traffic database 410 to generate a known network traffic report 106 in step 405 and sends it to the central processing server 104 in step 404.

Figure 5:
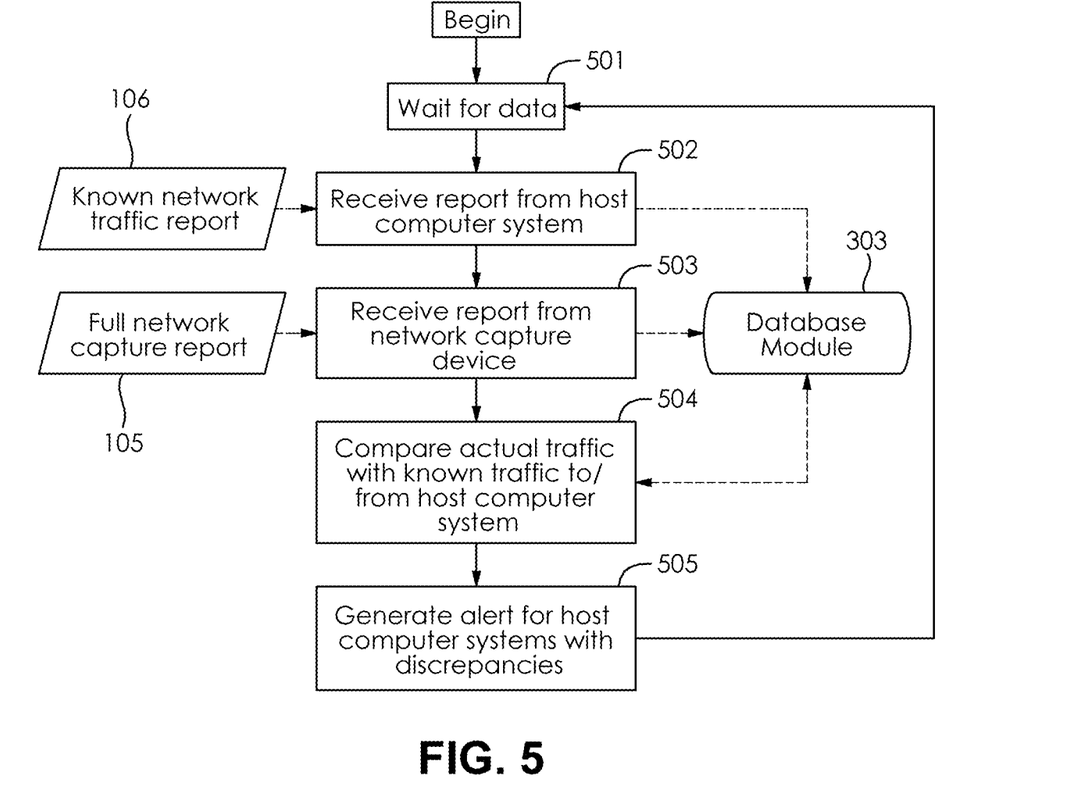
FIG. 5 is a flowchart depicting the high-level operation of the central processing server.

According to an embodiment of the present invention, FIG. 5 shows a flowchart of the operation of the central processing server 104. In step 501, the central processing server 104 waits for data to be available. Waiting does not have to be for any appreciable amount of time and the central processing server need not wait at all. If data is already available, the central processing server 104 will proceed immediately to step 502 without waiting and receive a known network traffic report 106 from the host computer system 103. The central processing server 104 then receives a network capture report 105 from the network capture device 102 in step 503. The data from the network capture report 105 and known network traffic report 106 is stored in the database module 303. In step 504, the central processing server 104 compares the actual traffic with the known network traffic 212 to or from a host computer system 103. If any discrepancies (indicating stealth network traffic) were discovered, an alert is generated in step 505.

Figure 6:
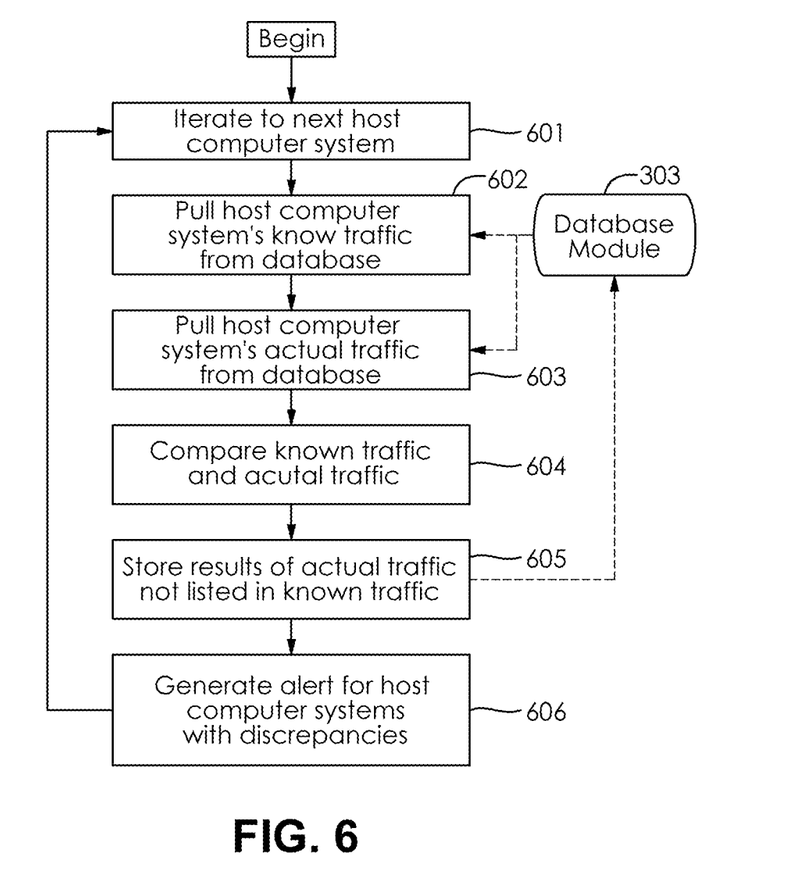
FIG. 6 is a flowchart depicting the detailed operation of the calculation module which performs comparisons between known network traffic and actual network traffic to detect stealth network traffic.

FIG. 6 gives a detailed flowchart for the operation of the calculation module. According to an embodiment of the present invention, in step 601, the calculation module 304 iterates to the next host computer system. In order to reduce the amount of data that needs to be processed and simplify the comparison of actual network traffic to known network traffic 212, the calculation module 304 analyzes the network traffic corresponding to one host computer system 103 at a time. In step 602, the calculation module 304 pulls the host computer system's 103 known network traffic 212 from the database module 303, then, in step 603, pulls the host computer system's 103 actual traffic from the database module 303. The calculation module then compares, in step 604, the known network traffic 212 to the actual network traffic, as reported by the network capture device 102. Any traffic that belongs to the particular host computer system 103 but does not show up in the known network traffic report 106 for the same host computer system 103 is considered stealth network traffic 211. The results of this comparison are sent back to the database module 303, in step 605. If any discrepancies were found, an alert is generated for the appropriate host computer system 103 in step 606.

Figure 4:
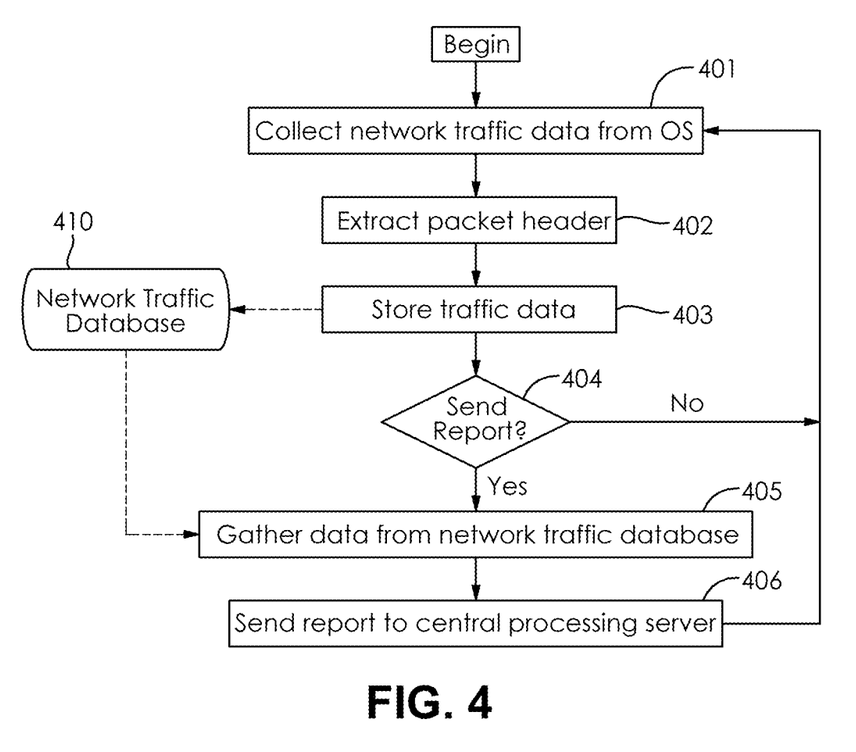
FIG. 4 is a flowchart depicting the operation of the monitoring and reporting module.

The steps described in FIG. 4-6 need not be performed in the exact order as described, and another storage structure could take the place of the database module. The requirement for a monitoring and reporting module 208 running on the host computer system 103 may be satisfied by a separate piece of software created by a third party that generates data, possibly for an unrelated purpose, suitable for use in the present invention. The important aspect is that information about the known network traffic be made available to the central processing server 104. The embodiment of the central processing server described is one of many possible embodiments of the present invention. The specific modules described could be combined, either partially or wholly, or separated into more specialized modules.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, JAVA™, JAVASCRIPT™, assembly language, LISP™, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for detecting stealth network traffic comprising:
   a computer machine comprising:
      a processor;
      a memory coupled to said processor;
      an operating system residing in a memory of said computer machine, and
      a network interface device operably coupled to said computer machine and configured to send and receive data over a network;
      a network capture device in operable communication with said computer machine, the network capture device being positioned at a gateway position in a first network, as an interface between and directly coupled to at least two computers of said first network and a second network, thereby enabling said network capture device to simultaneously capture network traffic data transmitted to or from said at least two computers over said first network; wherein the network traffic data comprises a plurality of data packets, and wherein the network capture device is on a separate physical machine from the at least two computers being monitored;

said network capture device comprising:
  a processor;
  a memory, the memory containing instructions that, when executed by the processor, configure the network capture device to:
    capture all known and unknown network traffic data transmitted to or from said at least two monitored host computer systems over said first network, wherein said known network traffic comprises all network traffic known to an operating system of said at least two monitored host computer systems and said unknown network traffic comprises all network traffic not known to said operating system of said at least two monitored host computer systems;
    extract a packet header information portion from data packets of said captured known and unknown network traffic data,
    store said captured known and unknown network traffic data in a database of said network capture device,
    generate a network capture traffic report based on said extracted network traffic packet header information portion of said data packets of said known and unknown network traffic data, and
    forward said network capture report via encrypted communication to a central processing server upon at least one of: (1) the expiration of a timer, (2) receiving a request from a central server, and (3) after a specific number of packets have been processed,
  a monitoring and reporting circuit communicatively coupled to said operating system and configured to acquire network communications data from said operating system, wherein said network communications data comprises network traffic that is received or sent over communication channels in said computer that are recognized by said operating system as being legitimate communication channels,
    wherein said monitoring and reporting circuit extracts a packet header information portion from data packets of said network communications data,
    wherein analysis performed by said monitoring and reporting circuit is exclusively limited to examining the packet header information portion of each acquired data packet,
    wherein said monitoring and reporting circuit generates a known network traffic report based on the analyzed data packet header information portion; and
  a central processing server configured to receive said network capture report and said known network traffic report, and compare traffic data contained in said reports,
    wherein said central processing server performs said comparison to identify any traffic discrepancies between said reports,
    wherein said central processing server is configured to generate an alert notification when a traffic discrepancy is identified and retrieve the full data packet that triggered the alert in order to analyze the data packet's payload for possible malware and comprised data,
    wherein said alert notification includes packet header information for each traffic discrepancy identified, and
    wherein said central processing server is configured to exclude designated predetermined network devices from being subject to analysis of network traffic to and from said designated predetermined network devices.

2. The system of claim 1 further comprising an alert circuit configured to generate said alert notification when a traffic discrepancy is identified.

3. The computer based system of claim 2 wherein said alert includes detailed information about said discrepancy indicating suspicious network traffic.

4. The method of claim 1, wherein said stealth network traffic is not known to said operating system.

5. The method of claim 1 wherein said monitoring and reporting circuit generates said known network traffic report based on the collected network communications data.

6. The method of claim 5, wherein said collected network communications data consists of network communications data packet header information.

7. The system of claim 1, wherein said traffic discrepancy indicates stealth network traffic.

8. The system of claim 7, wherein said stealth network traffic is not known to said operating system.

9. The system of claim 1, further comprising a monitoring and reporting circuit in operable communication with said operating system, wherein said monitoring and reporting circuit is configured to collect said network communications data from said operating system.

10. The system of claim 9 wherein said monitoring and reporting circuit generates said known network traffic report based on the collected network communications data.

11. The system of claim 1, wherein performing said comparison involves comparing packet header information of said network communications data to packet header information of said captured network traffic.

12. The system of claim 1, wherein said network capture report is compiled from information gathered by a plurality of network capture devices.

13. A method of detecting stealth network traffic comprising the steps of:
  (a) installing a network capture device at a gateway position in a first network, said network capture device being positioned at a gateway position in said first network positioned between and directly coupled to at least two monitored host computer systems of said first network and a second network, thereby enabling said network capture device to simultaneously capture all known and unknown network traffic data transmitted to or from said at least two monitored host computer systems over said first network; wherein the network traffic data comprises a plurality of data packets, and wherein the network capture device is on a separate physical machine from the at least two computers being monitored; wherein said known network traffic comprises all network traffic known to an operating system of said at least two monitored host computer systems; wherein said unknown network traffic comprises all network traffic not known to said operating system of said at least two monitored host computer systems;

(b) a processor coupled to a memory containing instructions that, when executed by the processor, configure the network capture device to:
capture all of said known and unknown network traffic data transmitted to or from said at least two monitored host computer systems over said first network,
extract a packet header information portion from data packets of said captured known and unknown network traffic data,
store said captured known and unknown network traffic data in a database of said network capture device,
generate a network capture traffic report including at least said extracted network traffic packet header information portion of said data packets of said known and unknown network traffic data and said data packets of said known and unknown network traffic data, and
forward said network capture report via encrypted communications to a central processing server upon at least one of: (1) the expiration of a timer, (2) receiving a request from a central server, and (3) after a specific number of packets have been processed;

(c) a processor coupled to a memory containing instructions that, when executed by the processor, configure the at least two monitored host computer systems to:
capture all of said known network traffic data transmitted to or from one of said monitored host computer systems over said first network,
extract a packet header information portion from said captured known network traffic data,
store said captured known network traffic data in a database of said network capture device,
perform an analysis that is exclusively limited to examining the extracted packet header information portion of said captured known network traffic data,
generate a known network traffic report including said analyzed network traffic packet header information portions of said data packets of said known network traffic data,
forward said network capture report to a central processing server upon at least one of: (1) the expiration of a timer, (2) receiving a request from a central server, and (3) after a specific number of packets have been processed;

(d) a processor coupled to a memory containing instructions that, when executed by the processor, configure the central processing server to:
receive said network capture traffic report from said network capture device,
receive said known network traffic report from said at least two monitored host computer systems,
compare said known network capture report received from said at least two monitored host computer systems with said network capture traffic report received from said network capture device by examining the respective packet header portions in each of said reports to identify data discrepancies between each of said reports,
generate an alert when at least one traffic discrepancy is identified and retrieve the full data packet that triggered the alert in order to analyze the data packet's payload for possible malware and comprised data, wherein said alert identifies a packet header for each traffic data discrepancy identified, and
exclude designated network devices from being subject to analysis of network traffic to and from said designated network devices.

14. The method of claim 13 wherein said network capture report is compiled from information gathered by a plurality of network capture devices.

15. The method of claim 13, wherein said traffic discrepancy indicates stealth network traffic.

16. The method of claim 13, wherein said stealth network traffic is not known to said operating system.

17. The method of claim 13, further comprising the step of installing a monitoring and reporting circuit in said computer, wherein said monitoring and reporting circuit is configured to collect said network communications data from said operating system.

18. The method of claim 16 wherein said monitoring and reporting circuit generates said known network traffic report based on the collected network communications data.

19. The method of claim 17, wherein said collected network communications data consists of network communications data packet header information.

20. The method of claim 13, wherein performing said comparison involves comparing packet header information of said network communications data to packet header information of said captured network traffic.

* * * * *